US009063750B2

(12) United States Patent
Gupta et al.

(10) Patent No.: US 9,063,750 B2
(45) Date of Patent: Jun. 23, 2015

(54) MAPPING HIGH-PERFORMANCE COMPUTING APPLICATIONS TO PLATFORMS (75) Inventors: Abhishek Gupta, Champaign, IL (US); Dejan S Milojicic, Palo Alto, CA (US); Paolo Faraboschi, Sant Cugat Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 13/363,722

(22) Filed: Feb. 1, 2012

(65) Prior Publication Data
US 2013/0198723 A1 Aug. 1, 2013

(51) Int. Cl.
G06F 9/46 (2006.01)
G06F 11/30 (2006.01)
G06F 9/44 (2006.01)
G06F 11/34 (2006.01)
G06F 9/50 (2006.01)

(52) U.S. Cl.
CPC .............. *G06F 9/44* (2013.01); *G06F 11/3428* (2013.01); *G06F 11/3409* (2013.01); *G06F 11/3447* (2013.01); *G06F 2201/865* (2013.01); *G06F 9/5072* (2013.01); *G06F 9/5094* (2013.01); *G06F 2209/501* (2013.01); Y02B 60/142 (2013.01)

(58) Field of Classification Search
None
See application file for complete search history.

(56) References Cited

U.S. PATENT DOCUMENTS

| 7,433,931 | B2 | 10/2008 | Richoux |
| 7,506,297 | B2 | 3/2009 | Mukherjee et al. |
| 7,788,671 | B2 | 8/2010 | Black-Ziegelbein et al. |
| 8,005,879 | B2 | 8/2011 | Bornhoevd et al. |
| 8,219,358 | B2 * | 7/2012 | Yatko et al. ................... 702/186 |
| 2010/0094592 | A1 | 4/2010 | Cherkasova et al. |

OTHER PUBLICATIONS

Braun et al.; A Taxonomy for Describing Matching and Scheduling Heuristics for Mixed-Machine Heterogeneous Computing Systems, Reliable Distributed Systems, 1998. Proceedings. Seventeenth IEEE Symposium on , vol., No., pp. 330,335, Oct. 20-23, 1998.*
McIntosh-Smith et al; Eergy-Aware Metrics for Benchmarking Heterogeneous Systems; ACM SIGMETRICS Performance Evaluation Review—Special issue on the 1st international workshop on performance modeling, benchmarking and simulation of high performance computing systems (PMBS 10) vol. 38 Issue 4, Mar. 2011, pp. 88-94.*

* cited by examiner

*Primary Examiner* — Meng An
*Assistant Examiner* — Bing Zhao
(74) *Attorney, Agent, or Firm* — Hewlett-Packard Patent Department (57) ABSTRACT

The mapping of High Performance Computing ("HPC") applications to platforms is provided. An HPC application characterization module determines an HPC application signature to characterize the HPC application. An HPC application mapping module selects a platform from a plurality of platforms to execute the HPC application based on the HPC application signature and a set of benchmarks. An HPC application monitoring module monitors the execution of the HPC application on the selected platform.

19 Claims, 12 Drawing Sheets

SIGN Jacobi
{
    N²/P        // Computation time (FLOPS) : Grain size
    4           // Number of messages
    N/√P        // Size of each message in bytes
    N²/P        // FLOPSPerBarrier (For Barrier based apps)
    True        // Is the application iterative or not?
    False       // Is period load balancing required?
}
```

SIGN FFT
{
    (Nxlog₂N)/P // Computation time (FLOPS) : Grain size
    log₂P       // Number of messages
    N/P         // Size of each message in bytes
    -1          // FLOPSPerBarrier (For Barrier based apps)
    False       // Is the application iterative or not?
    False       // Is period load balancing required?
}
```

MAPPING HIGH-PERFORMANCE COMPUTING APPLICATIONS TO PLATFORMS

BACKGROUND

High-Performance Computing ("HPC") applications are increasingly being used in academia and laboratories for scientific research and in industries for business and analytics. These applications may run on a variety of platforms such as, for example, supercomputers, clusters, and the cloud, and are used in fields as diverse as medical imaging, financial services, molecular biology, energy, cosmology, geophysics, manufacturing, and data warehousing, among others. A common challenge affecting HPC applications is their need to accelerate the processing of vast amounts of data (e.g., in the teraflops or petaflops) among multiple processors or processor cores working in parallel.

HPC users typically have access to platforms of varying resources, such as servers with different processor types and speed, different interconnection networks, and with or without virtualization. The platforms may also have different charging rates and models, with some freely available and others charging the users for compute capacity per hour. In addition, as platforms are moving into a world of hybrid clouds and deployments, a part of the computing resources may be under user's control and another part may be in the cloud. As a result, the number of choices available to HPC users when selecting a platform or platforms to run their HPC applications can be daunting. Existing HPC scheduling systems are not designed to deal with those choices. Hence, HPC users are faced with the challenge of choosing a platform to run a given HPC application based upon limited knowledge of application characteristics, platform capabilities, and users' preferences (e.g., QoS, cost, sustainability, and so on). Selecting a platform to run a given HPC application therefore remains one of the key challenges faced by HPC users today.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A method, system, and non-transitory computer readable medium for mapping HPC applications to platforms are disclosed. As generally described herein, an HPC application refers to a data and compute intensive application (e.g., in the teraflops range or above) that executes simultaneously in multiple parallel processors or processor cores of a platform. A platform refers to an architecture and software framework that allows HPC and other applications to run. For example, a platform may include a supercomputer, a computing cluster, and a cloud computing system, among others.

In various embodiments, an HPC application is mapped to an optimal platform that is selected among various platforms available for use. The optimal platform is selected according to characteristics and benchmarking of the HPC application in the various platforms, characteristics of the various platforms, user preferences, and live monitoring of the HPC application. As described in more detail herein below, an HPC Application Management Component is implemented to characterize the HPC application and various platforms, benchmark the HPC application to determine its expected performance, select an optimal platform among the various platforms, and monitor the performance of the HPC application when executing on the selected optimal platform to determine whether any adjustments are required to the platform selection.

It is appreciated that embodiments described herein below may include various components and features. Some of the components and features may be removed and/or modified without departing from a scope of the method, system, and non-transitory computer readable medium for mapping HPC applications to platforms. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the sane embodiment. As used herein, a component is a combination of hardware and software executing on that hardware to provide a given functionality.

Figure 1:
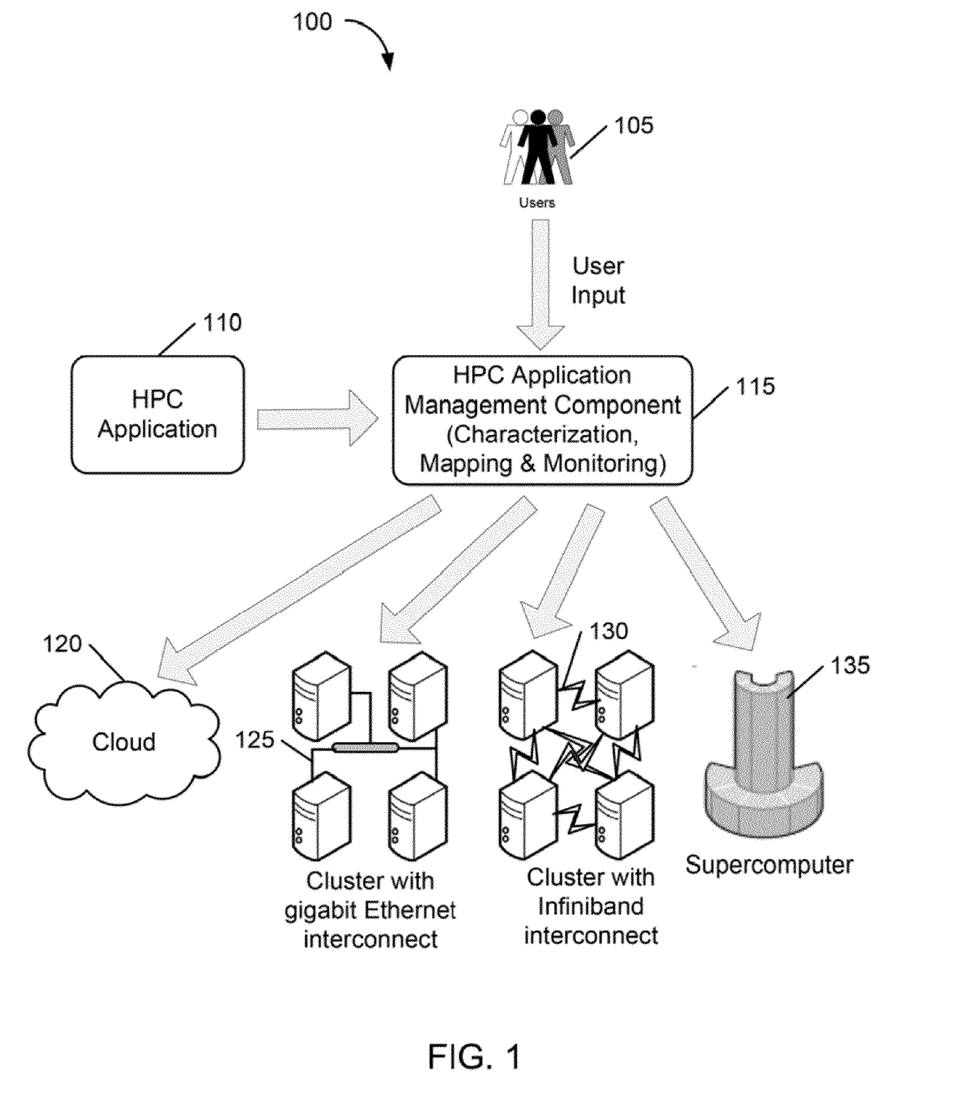
FIG. 1 is a schematic diagram illustrating an example HPC environment in which the various embodiments may be implemented.

Referring now to FIG. 1, a schematic diagram illustrating an example HPC environment in which the various embodiments may be implemented is described. HPC environment 100 generally consists of users 105, HPC Application 110, HPC Application Management Component 115, and various platforms, such as cloud computing system 120, computing cluster 125 with a gigabit Ethernet interconnect, computing cluster 130 with an Infiniband interconnect, and supercomputer 135. Users 105 have an HPC application 110 that they desire to run on a given platform. The HPC application 110 is a data and compute intensive application (e.g., in the teraflops range or above) that executes simultaneously in multiple parallel processors or processor cores of a platform. Examples include scientific and research applications in diverse fields, data intensive business applications, manufacturing applications, and so on. The users 105 may have multiple platforms available at their disposal to run the HPC application, as illustrated, for example, with platforms 120-135. Additional platforms (not shown) may also be available for selection by the users 105, such as computing clusters with different networking interconnects and other capabilities.

The HPC Application Management Component 115, as described in more detail below, enables the users 105 to select an optimal platform from all the available platforms to execute the HPC application 110. As appreciated by one skilled in the art, an optimal platform refers to a platform that surpasses all other available platforms in terms of a number of selected performance and cost criteria. The performance and cost criteria are determined by benchmarking the HPC application, 110 in the various platforms that are available for use (e.g., platforms 120-135). The performance and cost criteria may include, for example, the parallel efficiency of the HPC application 110 based on computation and communication patterns and platform characteristics (such as sequential and network performance in terms of interconnect latency and bandwidth), execution time, $CO_2$ emission, and cost calculated according to application performance and platform charging rate, among others.

Figure 2:
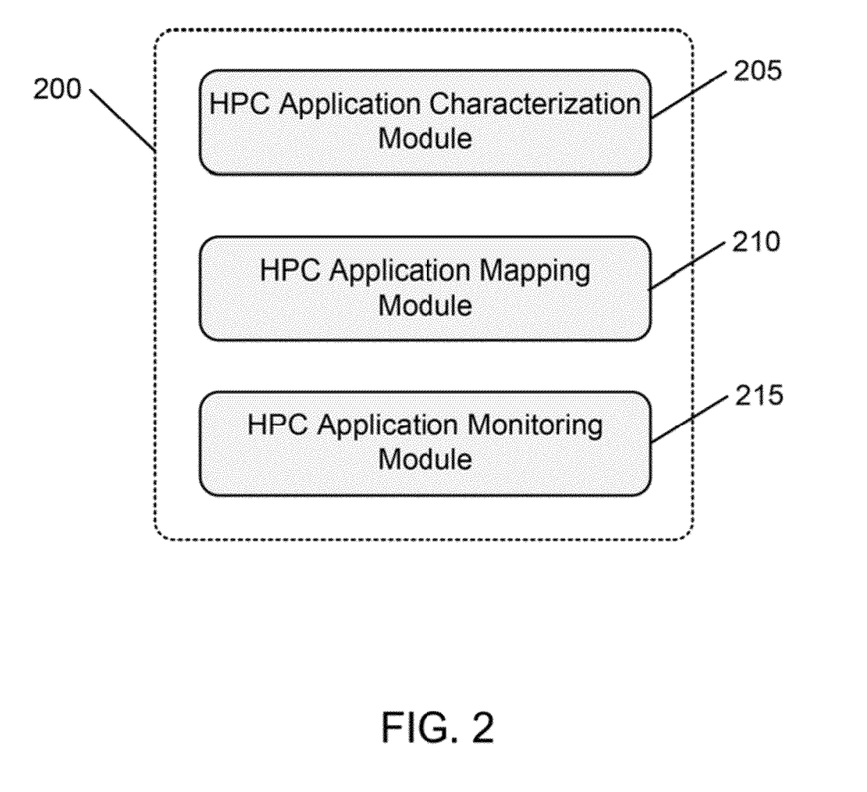
FIG. 2 is a schematic diagram illustrating an example HPC Application Management Component of FIG. 1 in more detail.

FIG. 2 illustrates an example HPC Application Management Component in more detail. HPC Application Management Component 200 includes three modules: HPC Application Characterization Module 205, HPC Application Mapping Module 210, and Application Monitoring Module 215. The HPC Application Characterization Module 205 characterizes the HPC application based on problem size, grain size, communication profile, load balancing requirements, and iterative requirements, among others. An application signature data structure is constructed to store the application characteristics which may be determined through application profiling by sample execution(s) (e.g., first few iterations for a long running application) on an actual or simulated platform. User input may also be acquired to gain additional detail and understanding of the HPC application and its implementation.

The HPC Application Mapping Module 210 characterizes each platform available for running the HPC application with a platform signature data structure that may be populated by one-time benchmarking of the platform. Factors that may be considered in characterizing the platform may include its CPU core speed and its sustained performance (for example expressed in floating point operations per second, or FLOPS), its inter node communication latency and bandwidth, its cost expressed as charging rate per processor hours, its idle power dissipation, its network power consumption per processor, and other factors such as a quantitative assessment of the operating system ("OS") noise, the bisection bandwidth of the interconnect fabric, and so on. Similar to the HPC Application Characterization Module 205, the HPC Application Mapping Module 210 may also consider user input. For example, the users may specify a set of weights to assign to each factor (such as performance, cost) according to its importance.

The HPC Application Mapping Module 210 is also responsible for running a set of benchmarks to evaluate the expected performance of the HPC application in each platform. The benchmarks determine a number of performance and cost criteria for the HPC application when running at each platform. The HPC Application Mapping Module 210 selects an optimal platform to execute the HPC application based on the results of the benchmarks. The optimal platform is the platform that surpasses all other available platforms in terms of the performance and cost criteria computed for the HPC application at each platform.

Lastly, the HPC Application Monitoring Module 215 monitors the performance of the HPC application when executing on the selected optimal platform to determine whether any adjustments are required to the platform selection. The monitoring may include, for example, the monitoring of the HPC application execution, such as by performing online profiling and analysis to determine if a remapping is required, and instructing the HPC Application Mapping Module 210 to perform the remapping if required. In various embodiments, both mapping and monitoring can be accomplished by using a runtime agent which is present on each platform and facilitates both static and dynamic mapping of applications to platforms as well as profiling. As appreciated by one skilled in the art, the remapping of an HPC application to a platform requires application migration to another platform using mechanisms such as checkpoint-restart or leveraging the built-in migration provisions of a software or hardware hypervisor, when available.

Figure 3:
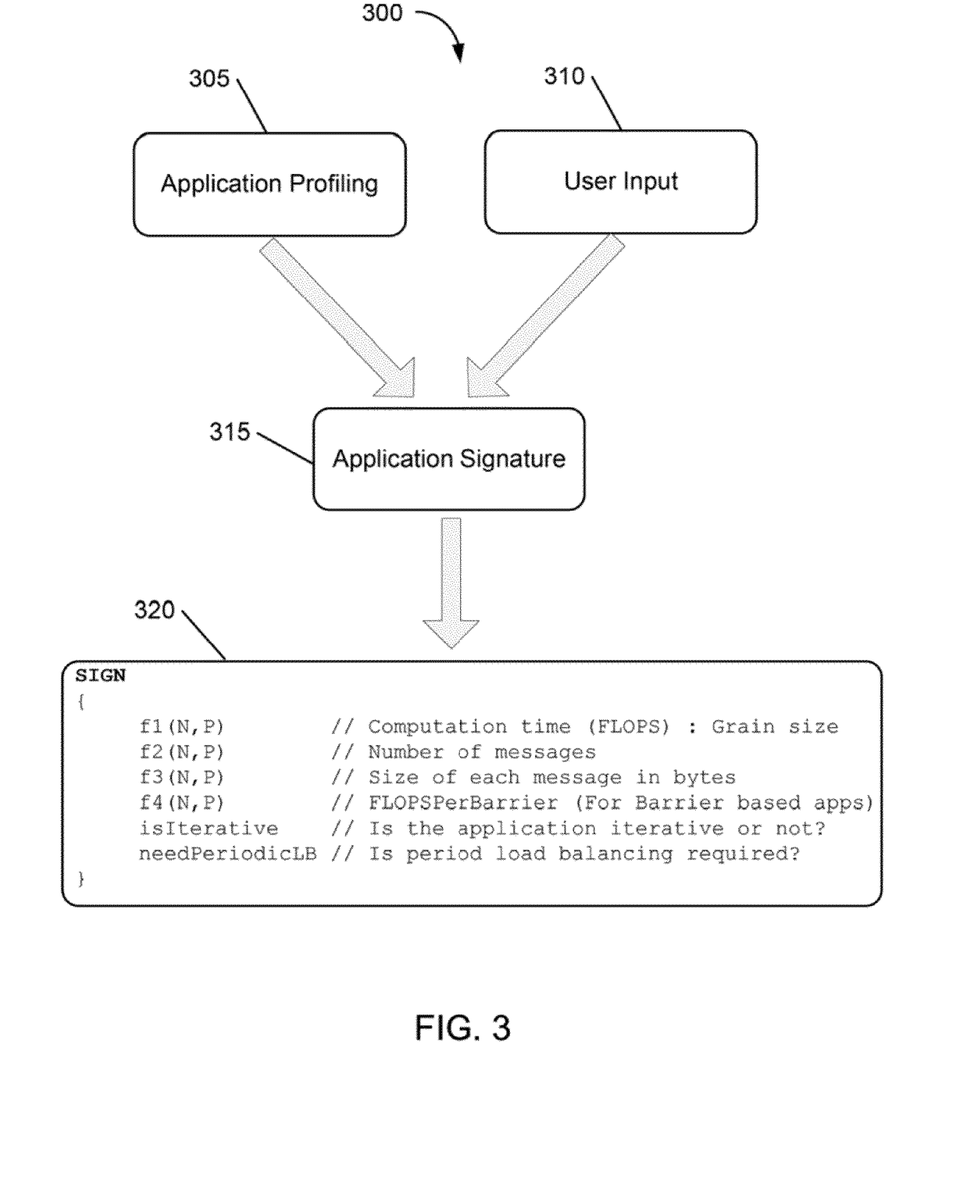
FIG. 3 is a schematic diagram illustrating an example HPC Application Signature data structure as constructed by the HPC Application Characterization Module of FIG. 2.

Attention is now directed to FIG. 3, which illustrates the HPC Application Signature data structure as constructed by the HPC Application Characterization Module of FIG. 2. HPC Application Characterization Module 300 characterizes an HPC application through Application Profiling 305 and by getting user input 310. Application Profiling 305 may perform a sample execution(s) (e.g., first few iterations for a long running application) of the HPC application on an actual or simulated platform. The user input 310 may also be acquired to gain additional detail and understanding of the HPC application and its implementation. The goal is to collect as much information about the HPC application as possible in order to populate an HPC Application Signature data structure such as, for example, the HPC Application Signature data structure 320.

The HPC Application Signature data structure 320 is a representation of HPC application characteristics which may include, for example, the computation time (e.g., grain size) to execute the HPC application, the number of communication messages required during the HPC application's execution, the size of each message, the computation time per Barrier for Barrier-based applications, and whether the application is iterative or load balancing is required. The characteristics may be given as a function of the problem size N and the number of processors P. An HPC application instance may therefore be defined as a tuple (N, P, SIGN), where SIGN is the HPC Application Signature data structure 320 (populated based on the values of N and P).

It is appreciated that additional parameters and characteristics may be included in the HPC Application Signature data structure 320. It is also appreciated that a populated HPC Application Signature data structure 320 may be simply referred to as an HPC application signature.

Figure 4A:
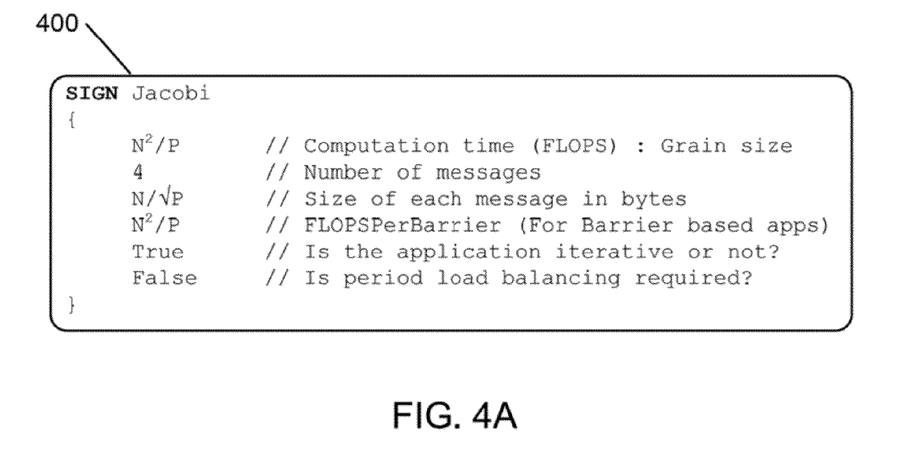
FIGS. 4A-B illustrate examples of populated HPC application signatures.
Figure 4B:
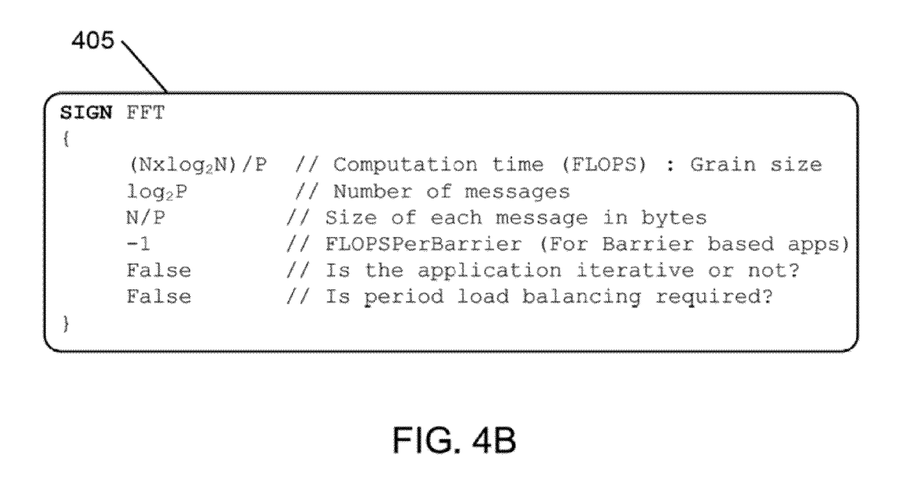

FIGS. 4A-B illustrate examples of populated HPC application signatures. FIG. 4A shows the HPC application signature 400 for a simple Jacobi 5-point stencil algorithm (e.g., using 2-D parallel decomposition) which does iterative computation on elements of a matrix of dimension N×N. FIG. 4B shows the HPC application signature 405 for a one-dimensional FFT computation of N points.

Figure 5:
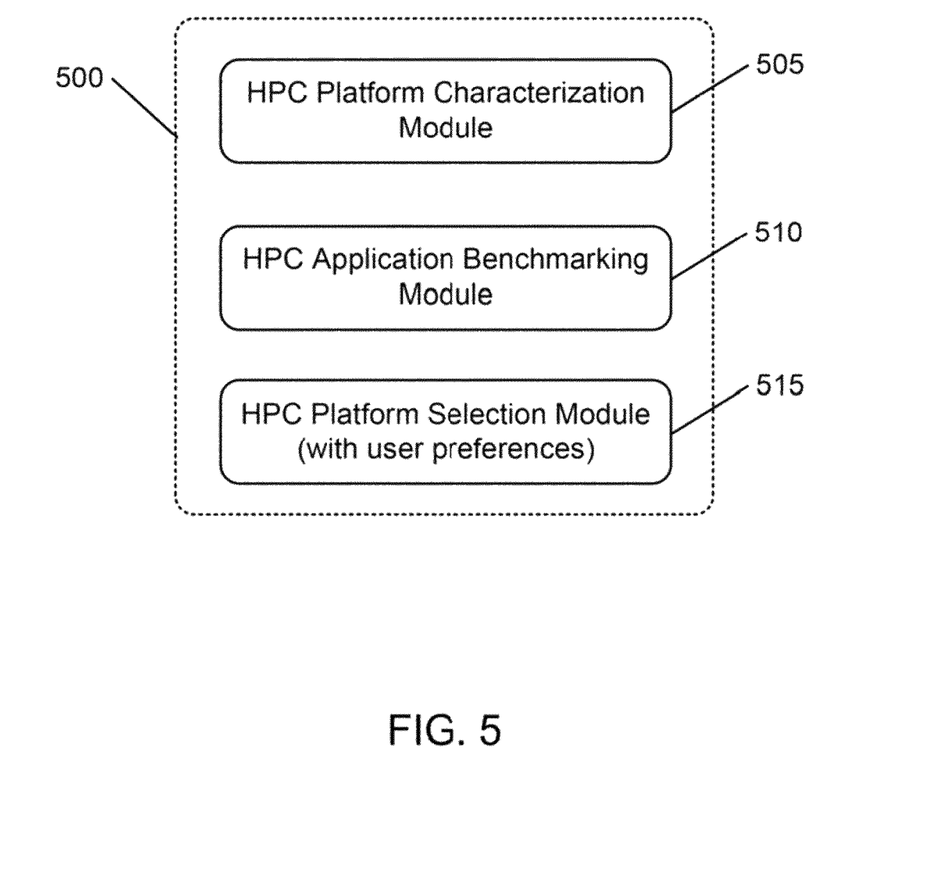
FIG. 5 is a schematic diagram illustrating an example HPC Application Mapping Module of FIG. 2 in more detail.

Referring now to FIG. 5, an example HPC Application Mapping Module of FIG. 2 is illustrated in more detail. HPC Application Mapping Module 500 includes an HPC Platform Characterization Module 505, an HPC Application Benchmarking Module 510, and an HPC Platform Selection Module 515. The HPC Platform Characterization Module 505 characterizes each platform available for running the HPC application with a platform signature data structure that may be populated by one-time benchmarking of the platform. The HPC Application Benchmarking Module 510 runs a set of benchmarks to evaluate the performance of the HPC application in each platform. The benchmarks determine a number of performance and cost criteria for the HPC application when running at each platform. Examples of benchmarks may include a benchmark to estimate the normalized performance of the HPC application when running in various platforms (FIG. 7), a benchmark to estimate the normalized cost of running the HPC application in various platforms (FIG. 8), a benchmark to estimate the normalized standard deviation on execution time for the HPC application in various platforms (FIG. 9), and a benchmark to estimate normalized $CO_2$ emission when running the HPC application in various platforms (FIG. 10), among others. The HPC Platform Selection Module 515 selects an optimal platform to execute the HPC application based on the results of the benchmarks.

Figure 6:
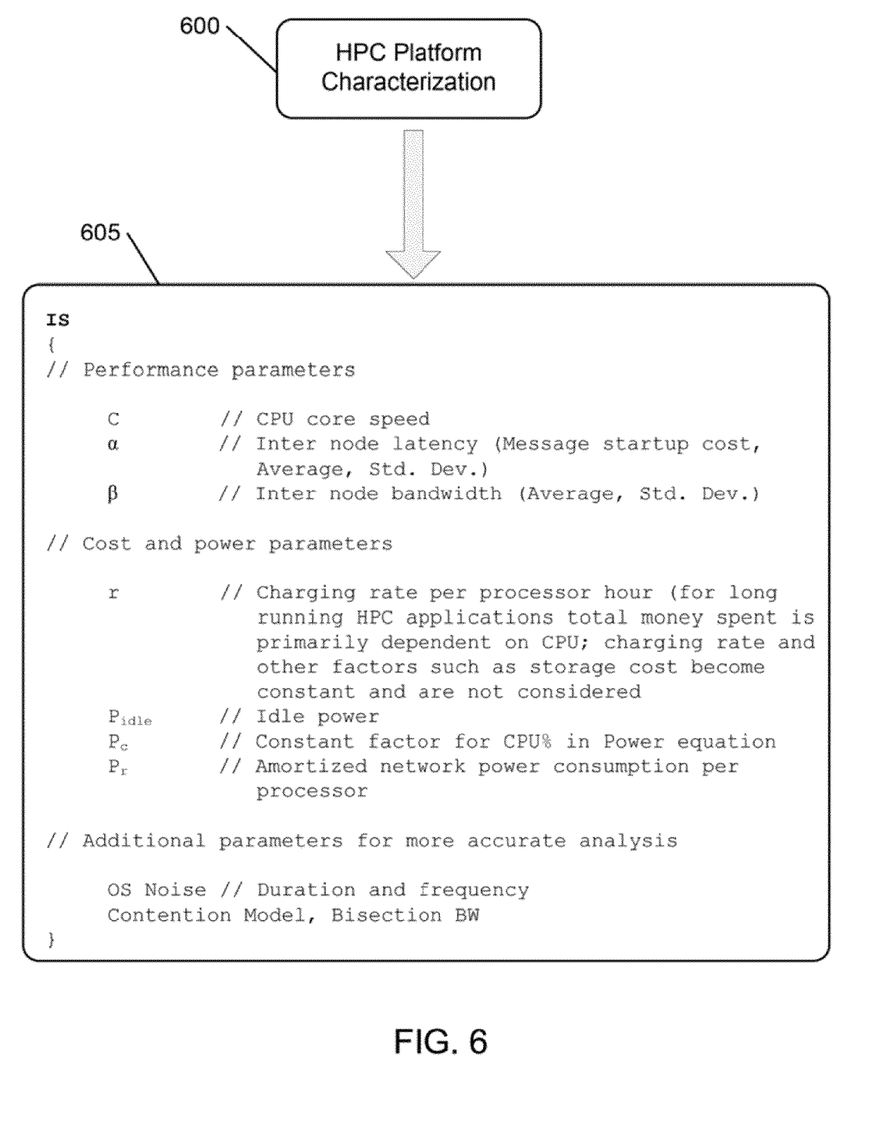
FIG. 6 is a schematic diagram illustrating the HPC Platform Characterization Module of FIG. 5 in more detail.

FIG. 6 illustrates the HPC Platform Characterization Module 505 in more detail. The HPC Platform Characterization Module characterizes each platform (600) with an HPC Platform Signature data structure 605 that may be populated by one-time benchmarking of the platform. The HPC Platform Signature data structure 605 is a representation of characteristics of a platform which may include, for example, its CPU core speed, its inter node latency and bandwidth, its charging rate per processor hours, its idle power, its network power consumption per processor, and others such as OS noise, bisection bandwidth, and so on.

It is appreciated that additional parameters and characteristics may be included in the HPC Platform Signature data structure 605. It is also appreciated that a populated HPC Platform Signature data structure 605 may be simply referred to as an HPC platform signature.

Figure 7:
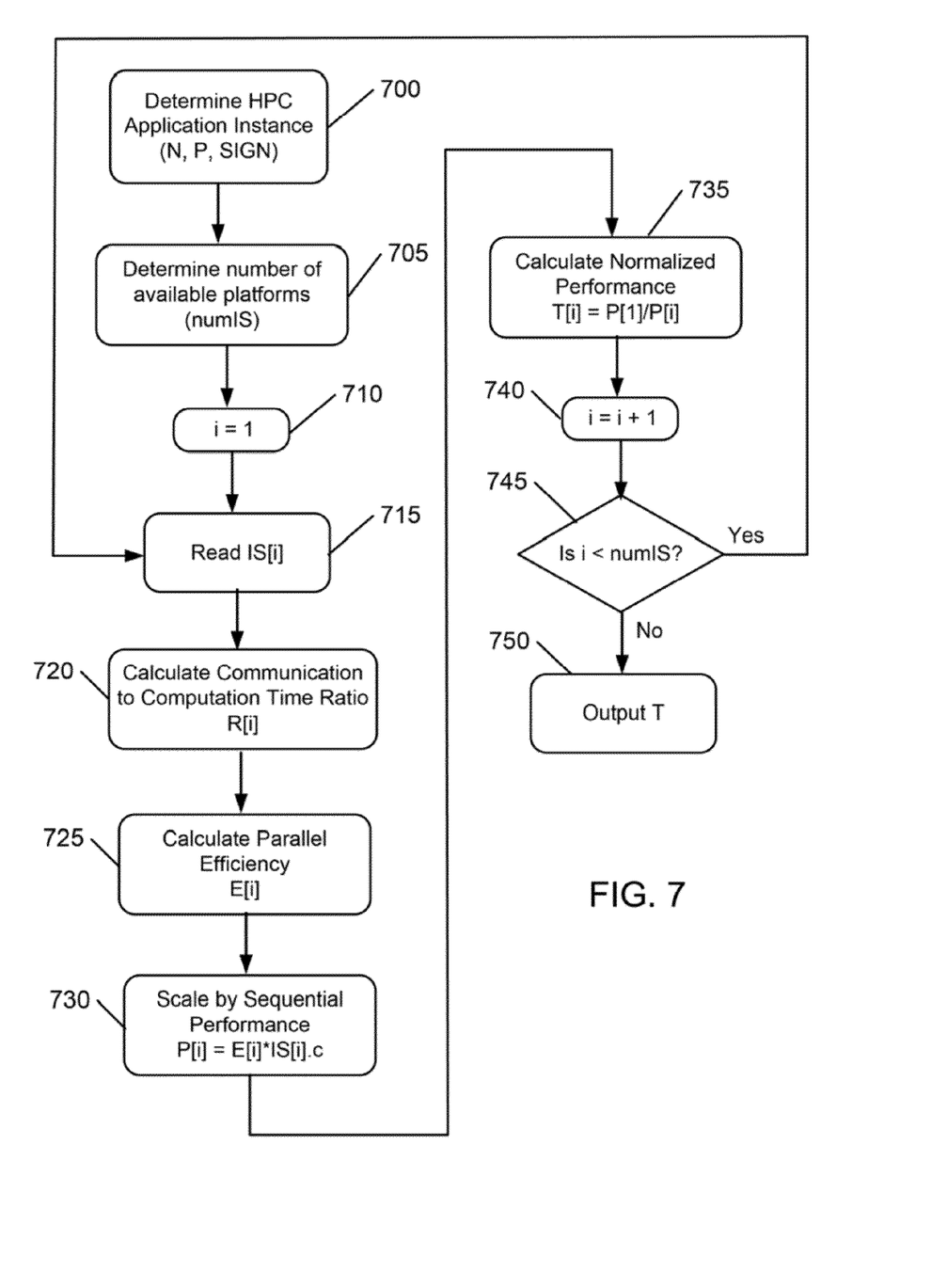
FIG. 7 is a flowchart for a benchmark to estimate the normalized performance of an HPC application when running in various platforms.

The benchmarks implemented in HPC Application Benchmarking Module 510 are now described in more detail. Referring to FIG. 7, a flowchart for a benchmark to estimate the normalized performance of the HPC application when running in various platforms is described. First, an application instance (N, P, SIGN) is determined for the HPC application (700). Next, the number of available platforms is determined and referred to as numIS (705). An index i to represent a running count of the available platforms is set and an execution loop is started (710) by first obtaining the HPC platform signature IS for the index i, i.e., IS[i] (715). The application instance (N, P, SIGN) and HPC platform signature IS[i] for the given platform (indexed by i) are then used to estimate a communication to computation time ratio R[i] as follows (720), where the "." operator in "S.f" indicates selecting field "f" in structure "S":

$$R[i]=[SIGN \cdot f2(N,P)(IS[i] \cdot \alpha+SIGN \cdot f3(N,P)/IS[i] \cdot \beta)]/[SIGN \cdot f1(N,P)/IS[i] \cdot C]$$ (Eq. 1)

Next, a parallel efficiency measure E[i] is calculated as (725):

$$E[i]=1/(1+R[i])$$ (Eq. 2)

The parallel efficiency measure is scaled by the CPU core speed to determine the sequential performance P[i] of the HPC application in the platform indexed by i (730):

$$P[i]=E[i]*IS[i] \cdot C$$ (Eq. 3)

The sequential performance is then scaled to obtain the normalized performance T[i] of the HPC application in the platform indexed by i (735):

$$T[i]=P[1]/P[i]$$ (Eq. 4)

Note that the normalized performance is computed to be inversely proportional to the sequential performance. This is done as a way to compare the normalized performance with the normalized cost and other benchmarking results when selecting the optimal platform for running the HPC application, as described in more detail below.

The loop continues by incrementing the index i (740) and repeating the steps 715-735 for each ISM until the index i reaches the number of available platforms, numIS (745). The result is output as a vector T to represent the normalized performance of the HPC application for the available platforms (750).

Figure 8:
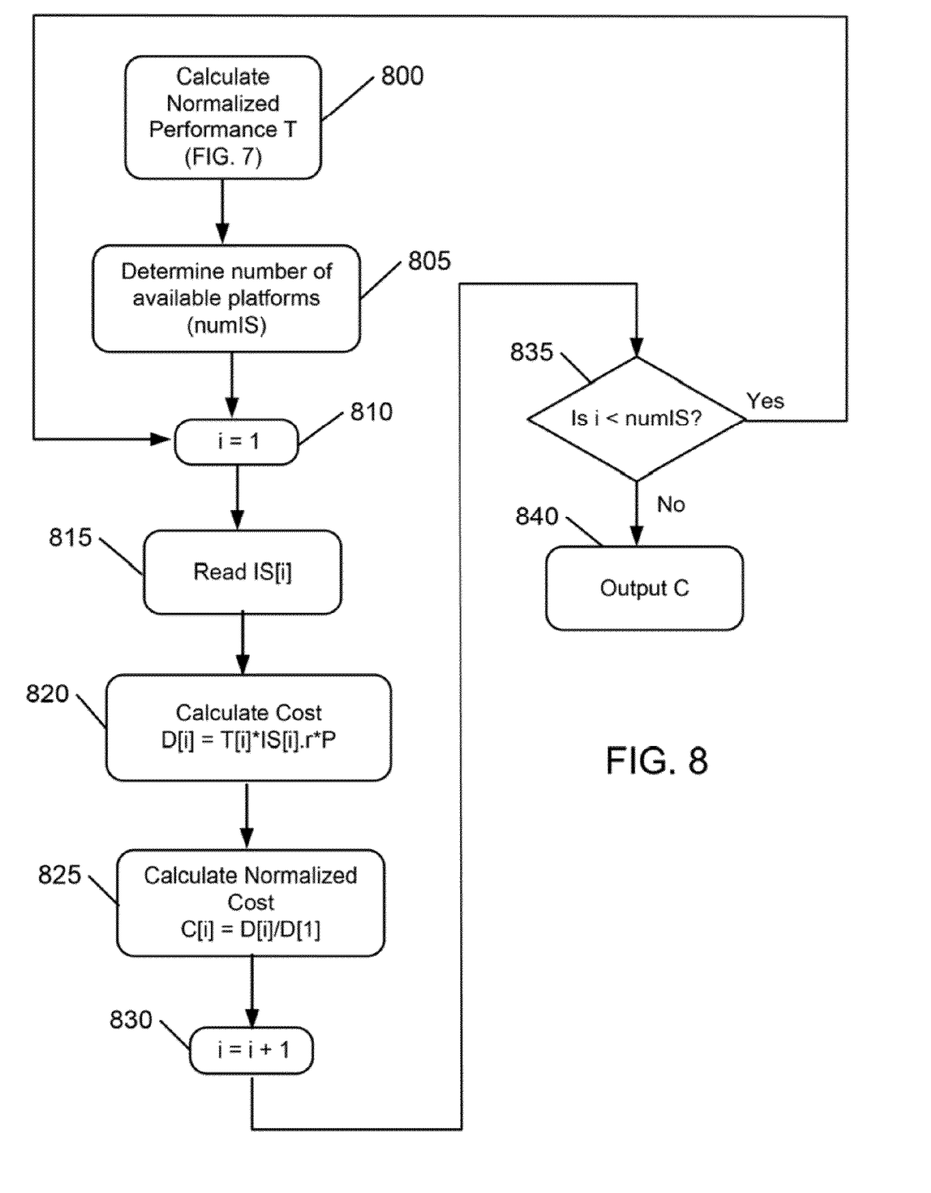
FIG. 8 is a flowchart for a benchmark to estimate the normalized cost of running an HPC application in various platforms.

Referring to FIG. 8, a flowchart for a benchmark to estimate the normalized cost of running the HPC application in various platforms is now described. First, the normalized performance of the HPC application is calculated as described above with reference to FIG. 7 (800). Next, the number of available platforms is determined and referred to as numIS (805). An index i to represent a running count of the available platforms is set and an execution loop is started (810) by first obtaining the HPC platform signature IS for the index i, i.e., IS[i] (815). The cost of running the HPC application in the platform indexed by i is calculated as follows (820):

$$D[i]=T[i]*IS[i] \cdot r*P$$ (Eq. 5)

where P again represents the number of processors available for the platform indexed by i. The normalized cost is calculated as (825):

$$C[i]=D[i]/D[1]$$ (Eq. 6)

The loop continues by incrementing the index i (830) and repeating the steps 815-830 for each ISM until the index i reaches the number of available platforms, numIS (835). The result is output as a vector C to represent the normalized cost of the HPC application for the available platforms (840).

Figure 9:
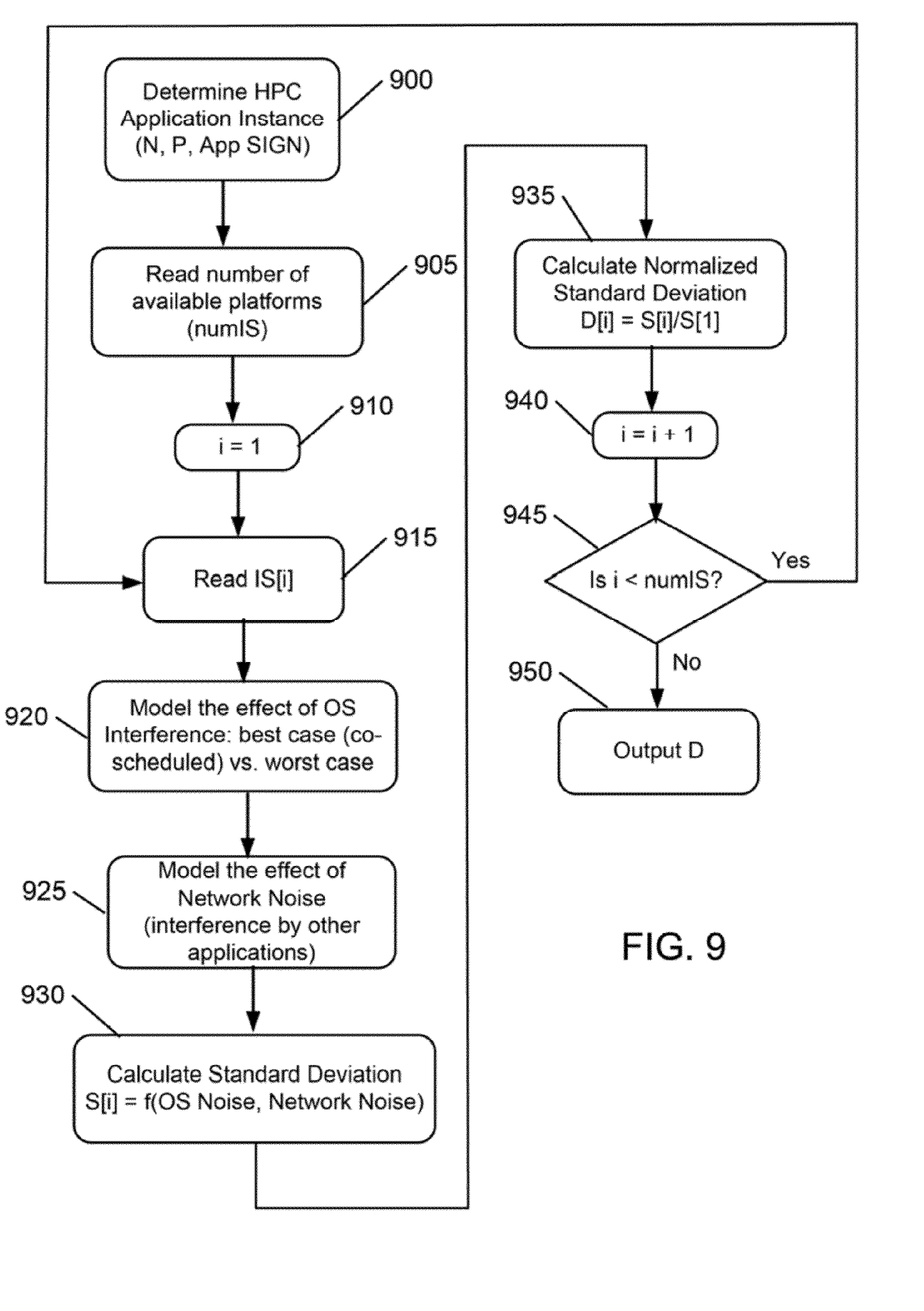
FIG. 9 is a flowchart for a benchmark to estimate the normalized standard deviation on execution time for an HPC application in various platforms.

Referring now to FIG. 9, a flowchart for a benchmark to estimate the normalized standard deviation on execution time for the HPC application in various platforms is described. First, an application instance (N, P, SIGN) is determined for the HPC application (900). Next, the number of available platforms is determined and referred to as numIS (905). An index i to represent a running count of the available platforms is set and an execution loop is started (910) by first obtaining the HPC platform signature IS for the index i, i.e., IS[i] (915). The application instance (N, P, SIGN) and HPC platform signature IS[i] for the given platform (indexed by i) are then used to model the effects of OS interference (920) and the effects of network noise (925).

The standard deviation is then calculated as (930):

$$S[i]=f(OS\ Noise, Network\ Noise)$$ (Eq. 7)

where $f$ denotes a function, such as, for example, a function statistically derived from measured data using various tools, e.g., excel, or approaches, e.g., curve Fitting. The normalized standard deviation is therefore given by (935):

$$D[i]=S[i]/S[1]$$ (Eq. 8)

The loop continues by incrementing the index i (940) and repeating the steps 915-940 for each IS[i] until the index i reaches the number of available platforms, numIS (945). The result is output as a vector D to represent the normalized standard deviation on execution time for the HPC application when executed on the available platforms (950).

Figure 10:
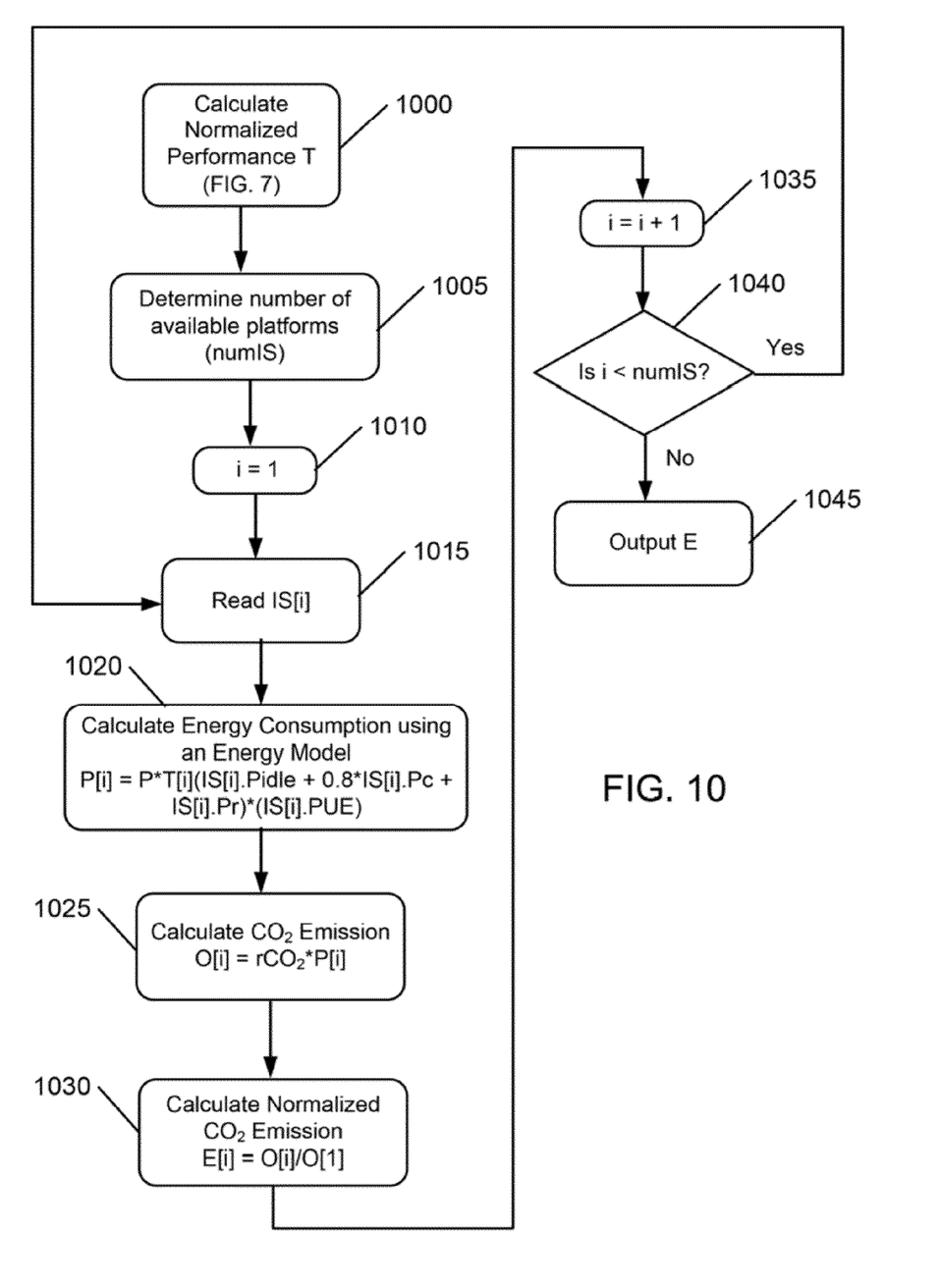
FIG. 10 is a flowchart for a benchmark to estimate the normalized $CO_2$ emission when running an HPC application in various platforms.

Referring now to FIG. 10, a flowchart for a benchmark to estimate normalized $CO_2$ emission when running the HPC application in various platforms is described. First, the normalized performance of the HPC application is estimated as described above with reference to FIG. 7 (1000). Next, the number of available platforms is determined and referred to as numIS (1005). An index i to represent a running count of the available platforms is set and an execution loop is started (1010) by first obtaining the HPC platform signature IS for the index i, i.e., IS[i] (1015). The energy consumption as a result of executing the HPC application in the platform indexed by i is calculated as follows (1020):

$$N[i]=P*T[i](IS[i] \cdot Pidle+0.8*IS[i] \cdot Pc+IS[i] \cdot Pr)*(IS[i] \cdot PUE) \quad \text{(Eq. 9)}$$

The $CO_2$ emission is then given by (1025):

$$O[i]=rCO_2*N[i] \quad \text{(Eq. 10)}$$

where $rCO_2$ is the rate of emission, that is kg per·Kwh. The normalized $CO_2$ emission is therefore (1030):

$$E[i]=O[i]/O(l) \quad \text{(Eq. 11)}$$

The loop continues by incrementing the index i (1035) and repeating the steps 1015-1035 for each IS[i] until the index i reaches the number of available platforms, numIS (1040). The result is output as a vector E to represent the normalized $CO_2$ emission when running the HPC application in the available platforms (1045).

It is appreciated that the benchmarks described with reference to FIGS. 7-10 are example benchmarks that may be used to characterize the performance of the HPC application when executed on the available platforms. Other benchmarks may also be employed to characterize the HPC application performance.

Figure 11:
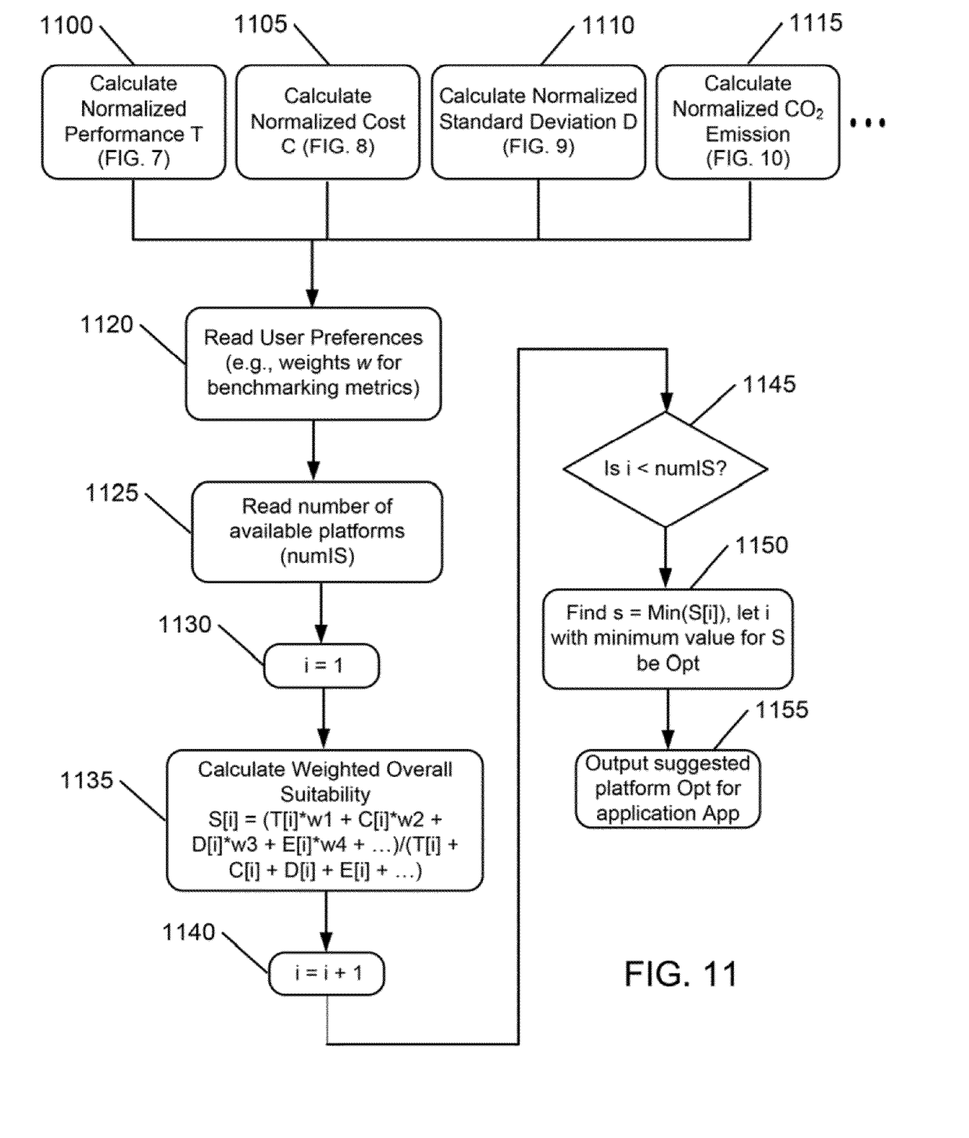
FIG. 11 is a flowchart for selecting an optimal platform for executing an HPC application based on the benchmarking results from FIGS. 7-10.

Attention is now directed to FIG. 11, which shows a flowchart for selecting an optimal platform for executing the HPC application based on the benchmarking results from FIGS. 7-10. The benchmarks for the HPC application are run for all available platforms, as described above with reference to FIGS. 7-10 (1100-1115). As many benchmarks as desired can be implemented to characterize the execution of the HPC application in the available platforms. In selecting the optimal platform, the HPC Platform Selection Module 515 in the HPC Application Mapping Module 210 considers preferences specified by the user(s). The user preferences may be specified in the form of weights that can be assigned to the benchmarking results (1120). The weights indicate a priority ranking of the benchmarking results according to the user(s) requirements. For example, one user may assign a higher weight to the normalized performance (FIG. 7) than the normalized $CO_2$ emission, another user may care more about the normalized cost than any other benchmarking metric, and so on.

Next, the number of available platforms is determined and referred to as numIS (1125). An index i to represent a running count of the available platforms is set and an execution loop is started (1130). A weighted overall suitability metric for executing the HPC application in the available platform indexed by i is computed as:

$$S[i]=(T[i]*w1+C[i]*w2+D[i]*w3+E[i]*w4+\ldots)/(T[i]+C[i]+D[i]+E[i]+\ldots) \quad \text{(Eq. 12)}$$

The loop continues by incrementing the index i (1140) and repeating the steps 1130-1135 for each available platform until the index i reaches the total number of available platforms, numIS (1145). The minimum weighted overall suitability is computed (1150) to determine the optimal platform (1155). The optimal platform is the one that surpasses all other available platforms in terms of the benchmarking results.

It is appreciated that other considerations may be used to determine the optimal platform. For example, the algorithm illustrated in FIG. 11 above may be modified to determine a recommended processor count for the optimal platform, a recommended single or multiple HPC application instance (e.g., increasing problem sizes with increasing processor counts), or to perform a dynamic remapping of the HPC application to another platform if it is probable that the user preferences and expectations may not be met on the selected optimal platform. It is also appreciated that more than one platform may be selected for execution of the HPC application. For example, the execution of the HPC application may be distributed across multiple platforms, e.g., a cloud computing system and a supercomputer.

As described above, the HPC Application Monitoring Module 215 monitors the performance of the HPC application when executing on the selected optimal platform to determine whether any adjustments are required to the platform selection. The monitoring may include, for example, managing the HPC application mapping to the platform, monitoring of the HPC application execution, such as by performing online profiling and analysis to determine if a remapping is required, and performing the remapping if required.

Figure 12:
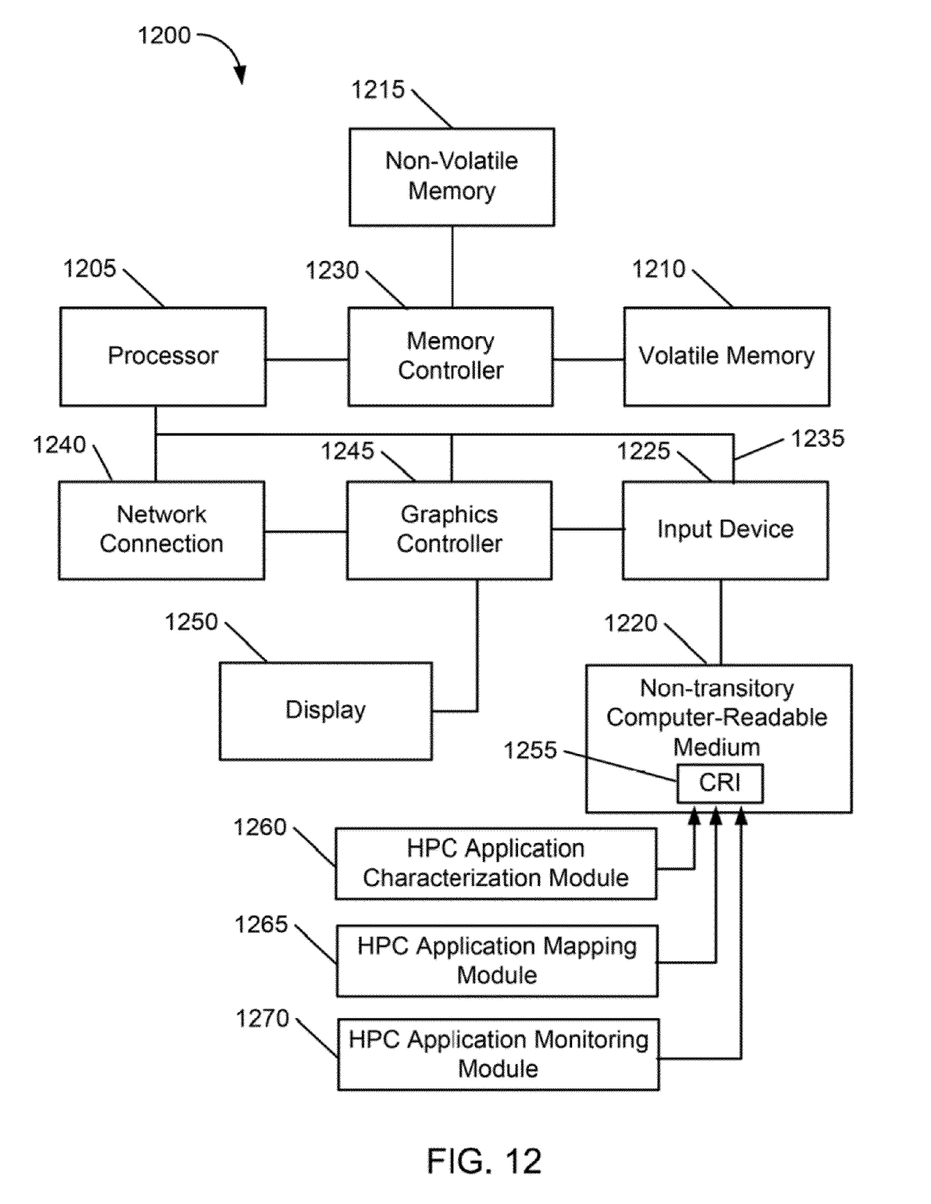
FIG. 12 is a block diagram of an example IT component of FIG. 1 according to the present disclosure.

As described above with reference to FIG. 2, the HPC Application Characterization Module 205, the HPC Application Mapping Module 210, and the HPC Application Monitoring Module 215 in the HPC Application Management Component 115 for performing the steps of FIG. 3 and FIGS. 6-11 can be implemented in hardware, software, or a combination of both. Referring now to FIG. 12, an IT component for implementing the HPC Application Management Component 115 of FIG. 1 according to the present disclosure is described. The IT component 1200 (e.g., a front-end component or a back-end component) can include a processor 1205 and memory resources, such as, for example, the volatile memory 1210 and/or the non-volatile memory 1215, for executing instructions stored in a tangible non transitory medium (e.g., volatile memory 1210, non-volatile memory 1215, and/or computer readable medium 1220) including logic configured to perform various examples of the present disclosure.

A machine (e.g., a computing device) can include and/or receive a tangible non-transitory computer-readable medium 1220 storing a set of computer-readable instructions (e.g., software) via an input device 1225. As used herein, the processor 1205 can include one or a plurality of processors such as in a parallel processing system. The memory can include memory addressable by the processor 1205 for execution of computer readable instructions. The computer readable medium 1220 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 1215 can be a local or remote database including a plurality of physical non-volatile memory devices.

The processor 1205 can control the overall operation of the IT component 1200. The processor 1205 can be connected to a memory controller 1230, which can read and/or write data from and/or to volatile memory 1210 (e.g., RAM). The memory controller 1230 can include a processor with its own memory resources (e.g., volatile and/or non-volatile memory). The volatile memory 1210 can include one or a plurality of memory modules (e.g., chips). The processor 1205 can be connected to a bus 1235 to provide communication between the processor 1205, the network connection 1240, and other portions of the IT component 1200. The non-volatile memory 1215 can provide persistent data storage for the IT component 1200. Further, the graphics controller 1245 can connect to an optional display 1250.

Each IT component 1200 can include a computing device including control circuitry such as a processor, a state machine, controller, and/or similar machine. As used herein, the indefinite articles "a" and/or "an" can indicate one or more than one of the named object. Thus, for example, "a processor" can include one or more than one processor, such as in a multi-core processor, cluster, or parallel processing arrangement.

The control circuitry can have a structure that provides a given functionality, and/or execute computer-readable instructions that are stored on a non-transitory computer-readable medium (e.g., the non-transitory computer-readable medium 1220). The non-transitory computer-readable medium 1220 can be integral, or communicatively coupled, to a computing device, in either a wired or wireless manner. For example, the non-transitory computer-readable medium 1220 can be an internal memory, a portable memory, a portable disk, or a memory located internal to another computing resource (e.g., enabling the computer-readable instructions to be downloaded over the Internet).

The non-transitory computer-readable medium 1220 can have computer-readable instructions 1255 stored thereon that are executed by the processor 1205 to implement an HPC Application Characterization Module 1260, an HPC Application Mapping Module 1265, and an HPC Application Monitoring Module 1270 according to the present disclosure. The non-transitory computer-readable medium 1220, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 1220 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

Advantageously, the HPC Application Management Component 115 described above applies novel techniques for mapping HPC applications to platforms. The techniques prevent overloading of a platform while others may be less loaded and more suitable to be selected for execution of the HPC application. This results in better utilization and match between platform demand and supply, hence enabling users to have an intelligent resource management tool at their disposal (i.e., the HPC Application Management Component 115). Additionally, by taking into account the users' preferences at each step of the platform selection, a better match between the users' expectation and the HPC application execution is provided. The runtime monitoring of an HPC application execution on a selected optimal platform further ensures that user expectations are met.

In addition, the selection of the optimal platform for executing the HPC application provides cost savings and reduced wait times for application execution since the incoming mix of HPC applications are distributed across the available platforms (rather than being concentrated into one platform) based on the benchmarking results. Users, application developers, and system owners can all benefit with the implementation of the HPC Application Management Component 115. Users can focus on application development and leave the onus of determining the optimal platform to the component 115. Application developers can benefit from application characterization by making implementation and design choices based on the available platforms. System owners can use the HPC Application Characterization Module 205 to target system design and features to specific classes of HPC applications.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular configuration, such as IT component 1200.

Those of skill in the art would further appreciate that the various illustrative modules and steps described in connection with the embodiments disclosed herein may be implemented as electronic hardware, computer software, or combinations of both. For example, the example steps of FIG. 3 and FIGS. 6-11 may be implemented using software modules, hardware modules or components, or a combination of software and hardware modules or components. Thus, in one embodiment, one or more of the example steps of FIG. 3 and FIGS. 6-11 may comprise hardware modules or components. In another embodiment, one or more of the steps of FIG. 3 and FIGS. 6-11 may comprise software code stored on a computer readable storage medium, which is executable by a processor.

To clearly illustrate this interchangeability of hardware and software, various illustrative components, blocks, modules, and steps have been described above generally in terms of their functionality (e.g., the HPC Application Characterization Module 1260, the HPC Application Mapping Module 1265, and the HPC Application Monitoring Module 1270). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A system for mapping a High Performance Computing ("HPC") application to a platform, comprising:
    an HPC application characterization module to determine an HPC application signature representative of characteristics of the HPC application, the HPC application signature based on a problem size and a number of processors of the system;

determining a plurality of HPC platform signatures representative of platform characteristics corresponding to a plurality of platforms;

an HPC application mapping module to select a platform from a plurality of platforms to execute the HPC application based on the HPC application signature and a $CO_2$ emission-benchmark, the $CO_2$ emission benchmark determined by estimating energy consumptions corresponding to executing the HPC application on each of the plurality of platforms; and an HPC application monitoring module to monitor the execution of the HPC application on the selected platform, wherein the $CO_2$ emission benchmark computes a benchmarking result using a mathematical formula based on the HPC application signature and the HPC platform signature for each platform in the plurality of platforms and at least one of the HPC application characterization module, the HPC application mapping module, or the HPC application monitoring module is implemented via a processor.

2. The system of claim 1, wherein the HPC application signature comprises a data structure with a plurality of fields identifying the characteristics, the fields selected from a group consisting of computation time, number of messages, size of messages, FLOPS per Barrier, whether the HPC application is iterative, and whether load balancing is required.

3. The system of claim 1, wherein the HPC application characterization module determines the HPC application signature based on sample profiling of the HPC application and on input from users of the HPC application.

4. The system of claim 1, wherein the HPC application mapping module determines an HPC platform signature for each platform in the plurality of platforms.

5. The system of claim 4, wherein each HPC platform signature comprises a data structure with a plurality of fields selected from a group consisting of CPU core speed, inter node latency, inter node bandwidth, charging rate per processor hours, idle power, network power consumption per processor, OS noise and bisection bandwidth.

6. The system of claim 4, wherein the HPC application mapping module determines the HPC platform signature for each platform based on sample profiling of each platform.

7. The system of claim 4, wherein the HPC application mapping module selects the platform from the plurality of platforms to execute the HPC application based on the HPC platform signature of each platform in the plurality of platforms.

8. The system of claim 1, wherein the HPC application mapping module calculates a weighted overall suitability metric to select the platform from the plurality of platforms to execute the HPC application.

9. The system of claim 8, wherein the weighted overall suitability metric is a weighted metric of user specified weights multiplied by the benchmarking result and at least one other benchmark.

10. The system of claim 8, wherein the platform selected from the plurality of platforms to execute the HPC application has a lower weighted overall suitability metric than each other platform in the plurality of platforms.

11. A method for mapping a High Performance Computing ("HPC") application to a platform, comprising:

determining an HPC application signature representative of application characteristics of the HPC application, the HPC application signature based on a problem size and a number of processors of the system;

determining a plurality of HPC platform signatures representative of platform characteristics corresponding to a plurality of platforms;

running a $CO_2$ emission benchmark by estimating energy consumptions corresponding to executing the HPC application on the plurality of platforms based on the HPC application signature and the plurality of HPC platform signatures to determine $CO_2$ emissions from executing the HPC application on each of the plurality of platforms, the $CO_2$ emission benchmark to compute a benchmarking result using a mathematical formula based on the HPC application signature and the HPC platform signature for each platform in the plurality of platforms; and selecting a platform from the plurality of platforms to execute the HPC application based on the benchmarking result.

12. The method of claim 11, wherein the HPC application signature comprises a data structure with a plurality of fields identifying the application characteristics, the fields populated by sample profiling of the HPC application and based on input from users of the HPC application.

13. The method of claim 11, wherein each HPC platform signature comprises a data structure with a plurality of fields identifying the platform characteristics, the fields populated by sample profiling of each corresponding platform.

14. The method of claim 11, wherein selecting a platform from the plurality of platforms comprises calculating a weighted overall suitability metric by multiplying the benchmarking result by user specified weights, the user specified weights identifying a weights corresponding to the $CO_2$ emission benchmark and at least one other benchmark.

15. The method of claim 11, wherein the platform selected from the plurality of platforms to execute the HPC application has a lower weighted overall suitability metric than each of the other platforms in the plurality of platforms.

16. A non-transitory computer readable medium having instructions stored thereon executable by a processor to:

determine a High Performance Computing ("HPC") application signature representative of characteristics of the HPC application, using a function based on a problem size and a number of processors of the system;

determining a plurality of HPC platform signatures representative of platform characteristics corresponding to a plurality of platforms;

run a $CO_2$ emission benchmark of the HPC application on a plurality of platforms based on the signature of the HPC application, the $CO_2$ emission benchmark determined by estimating energy consumptions corresponding to executing the HPC application on the plurality of platforms, the $CO_2$ emission benchmark to compute a benchmarking result using a mathematical formula based on the HPC application signature and the HPC platform signature for each platform in the plurality of platforms;

select a platform from the plurality of platforms to execute the HPC application based on the benchmarking result; and monitor execution of the HPC application on the platform to adjust the selection of the platform based on $CO_2$ emissions from executing the HPC application on the selected platform.

17. The non-transitory computer readable medium of claim 16, wherein the instructions to select the platform from the plurality of platforms comprise instructions to compute a weighted overall suitability metric by multiplying the results from the $CO_2$ emission benchmark and at least one other benchmark by user specified weights.

18. The non-transitory computer readable medium of claim 16, wherein the platform selected from the plurality of platforms to execute the HPC application has a lower weighted overall suitability metric than each other platform in the plurality of platforms.

19. The system of claim 1, wherein the $CO_2$ emission benchmark estimates normalized $CO_2$ emission to execute the HPC application on each of the plurality of platforms.

* * * * *